United States Patent
Furuya et al.

(10) Patent No.: US 8,569,206 B2
(45) Date of Patent: Oct. 29, 2013

(54) POROUS CARBON MATERIAL AND A METHOD OF PRODUCTION THEREOF

(75) Inventors: Hiroshi Furuya, Yamaguchi (JP); Yoshiki Fukuyama, Yamaguchi (JP); Shizukuni Yata, Hyogo (JP)

(73) Assignee: Tokuyama Corporation, Yamaguchi (JP)

( * ) Notice: Subject to any disclaimer, the term of this patent is extended or adjusted under 35 U.S.C. 154(b) by 365 days.

(21) Appl. No.: 12/999,340

(22) PCT Filed: Jun. 22, 2009

(86) PCT No.: PCT/JP2009/061308
§ 371 (c)(1),
(2), (4) Date: Dec. 16, 2010

(87) PCT Pub. No.: WO2009/157404
PCT Pub. Date: Dec. 30, 2009

(65) Prior Publication Data
US 2011/0092362 A1    Apr. 21, 2011

(30) Foreign Application Priority Data

Jun. 23, 2008 (JP) .................................. 2008-163688

(51) Int. Cl.
*C01B 31/08* (2006.01)

(52) U.S. Cl.
USPC ..................................... 502/416; 423/445 R

(58) Field of Classification Search
USPC ..................................... 423/445 R; 502/416
See application file for complete search history.

(56) References Cited

U.S. PATENT DOCUMENTS

| 5,614,460 A * | 3/1997 | Schwarz et al. ............. 502/418 |
| 6,294,501 B1 * | 9/2001 | Chang ........................... 502/418 |
| 2003/0170165 A1 | 9/2003 | Kojima et al. |

FOREIGN PATENT DOCUMENTS

| JP | 5319813 A | 12/1993 |
| JP | 6-32677 A | 2/1994 |
| JP | 07-187635 | 7/1995 |
| JP | 2001026414 A | 1/2001 |
| JP | 2003038953 A | 2/2003 |
| JP | 2006117523 A | 10/2005 |
| JP | 2008-044816 | 2/2008 |

OTHER PUBLICATIONS

International Preliminary Report on Patentability dated Feb. 8, 2011.
English Abstract of JP 6-32677.
Chinese Office Action dated Aug. 3, 2012, Chinese Patent Application No. 20098123566.0.
English Abstract for JP5319813.
English Abstract for 2006117523.
English Abstract for 2003038953.
English Abstract for 2001026414.
English Abstract for JP 07-187635.
English Abstract for JP 2008-044816.

* cited by examiner

*Primary Examiner* — Stuart Hendrickson
(74) *Attorney, Agent, or Firm* — Cahn & Samuels, LLP

(57) ABSTRACT

Disclosed is a method for producing a porous carbon material comprising: heating a cured phenolic resin complex lump, including 150 to 450 parts by weight of sodium hydroxide and/or potassium hydroxide per 100 parts by weight of phenolic resin, at a temperature of 420 to 850° C. in a non-oxidizing atmosphere to obtain carbonized material; and washing and removing sodium hydroxide and potassium hydroxide included in the carbonized material. According to the present invention, there can be provided a porous carbon material, including large volumes of subnano-pores having a diameter of in a range of 0.45 to 1.0 nm with a sharp distribution, which is particularly useful as a gaseous adsorbent.

2 Claims, No Drawings

POROUS CARBON MATERIAL AND A METHOD OF PRODUCTION THEREOF

This application is a U.S. national stage application of PCT/JP2009/061308 filed on Jun. 23, 2009 which claims priority of Japanese patent document 2008-163688 filed on Jun. 23, 2008 in Japan, the entireties of which are incorporated herein by reference.

TECHNICAL FIELD

The present invention relates to a new method for producing a porous carbon material and the porous carbon material obtained by the method. Specifically, the porous carbon material can be provided, which has a large volume of pores having a diameter of in a range of 0.45 to 1.0 nm (hereinafter may be referred to as a subnanopore) with a sharp distribution and is particularly useful as a gaseous adsorbent.

BACKGROUND OF THE INVENTION

A porous carbon material is widely used as battery material, catalyst, support for catalyst and the like, and there has been increased need for a high-functional porous carbon material serving as a gaseous adsorbent among these.

To explain the above background further specifically, next-generation energy is recently more demanded in view of environmental issues, issues on exhaustion of fossil fuels and the like. Especially, hydrogen energy is highly expected as very clean energy only generating water. For achieving utilization of hydrogen energy, each technology of hydrogen production, storage and use is required, but any of these has not yet reached practicable levels. Among these, the hydrogen storage technology is particularly lagged behind. The hydrogen storage requires various properties such as storage capacity, storage/release rate, released hydrogen purity, safety, cost and cycle characteristic, and a practicable hydrogen storage method satisfying these properties has not yet developed.

In general, hydrogen storage technology can roughly be divided into compressed hydrogen storage, liquid hydrogen storage and storage by a hydrogen storage material.

The compressed hydrogen storage is a method to fill hydrogen in a high-pressure tank in which carbon fiber is layered on the outside of liner made of resin, aluminum and the like. The energy density of the latest 70 MPa-high-pressure hydrogen gas container is only about 15% of energy density of gasoline at the most in reality. Furthermore, it is necessary to increase the thickness for ensuring pressure resistance, resulting in unavoidable increase in weight, and storage capacity of hydrogen is only approximately 3.5 to 4.5% of the weight of the tank.

On the other hand, liquid hydrogen storage attains energy density of 30% of gasoline's. However, there are problems such that the container needs to be insulated and cooled because hydrogen has very low boiling point of −253° C., and that large energy is necessary for liquefying hydrogen. Consequently, the liquid hydrogen storage cannot be excellent hydrogen storage method in view of cost and energy efficiency.

Based on these circumstances, the storage by a hydrogen storage material attracts attention, and a variety of materials, including hydrogen storage alloy, organic hydride, inorganic hydride, organic metal complex and porous carbon material, is now under development. Among the above, the porous carbon material has advantages such as a great deal of resources and lightweight, and attracts attention as a practical, strong candidate.

Typical carbon material includes graphite and activated carbon. The graphite has a hexagonal crystal structure in which graphene sheets stack. Although it has been subject to research and development for application to hydrogen storage material, the interlayer distance of the layers formed by the graphene sheets is 0.334 nm, which is too narrow as a space for storing hydrogen molecule. Then, there is reported an attempt that the interlayer of the graphite is expanded to make it porous.

For example, Patent Document 1 proposes an expanded graphite technology in which the interlayer distance is expanded by acid treatment and heating treatment to make hydrogen molecules enter the interlayer to be concentrated.

However, the interlayer of the graphene sheets is maintained by van der Waals' force, so that the expanded interlayer distance is unstable even when an appropriate interlayer distance for entering of hydrogen molecules is attained, causing problems such that due to repeated use, the interlayer distance becomes too small for hydrogen to enter, or that the interlayer distance becomes too large in contrast to obtain enrichment effect.

On the other hand, the activated carbon is a carbon material in which various carbonaceous materials as raw materials are activated by water vapor or chemicals to form large volume of pore. Since the pore of the activated carbon can be generated with progression of activation, the activated carbon is characterized by very broad pore distribution.

It has been traditionally known that the micropore of the activated carbon functions as a space for hydrogen storage and stores hydrogen. However, for the activated carbon, hydrogen storage capacity per unit weight with increase in its specific surface area, but it is difficult to increase hydrogen storage capacity per unit volume. This is because the activated carbon has broad pore distribution substantially including a lot of mesopores and macropores, and large pores unsuitable for hydrogen storage occupy a large part of the whole. Also, the production of the activated carbon is not effective in view of energy cost because two heating treatments at a temperature of approximately 800 to 1000° C. are necessary for carbonization and activation.

To overcome the above substantial problems of the activated carbon, Patent Document 2, for example, discloses a technology in which void spaces present between graphenes can be compressed to densify by high-pressure compression treatment. However, it requires high-pressure compression treatment at more than 300 MPa, and even in the activated carbon obtained by the above-mentioned densification, there are a lot of pores not involving hydrogen adsorption, so that it is far from satisfaction for hydrogen storage capacity per unit volume.

Patent Document 3 discloses a porous carbon material having phenolic resin as its raw material. According to Patent Document 3, the above porous carbon material is known to show a sharp pore distribution in which pores of 0.3 to 0.6 nm or so occupy the large part of entire pores. However, the volume of the above pores is small and still insufficient for the use as a hydrogen storage material, requiring further improvement.

Also, Patent Document 4 discloses a method for producing a porous carbon material in which a micelle of a surfactant is formed in a monomer or pre-polymer, followed by polymerization to form a micelle-containing organic polymer, and then it is subject to firing and carbonization. However, the obtained carbon material is small in subnanopore volume, and it is still insufficient for the use as a hydrogen storage material.

Namely, no porous carbon material, practically used as a hydrogen storage material, has yet been attainable, and it has been required to establish a method for producing a porous carbon material having pore volume larger than conventional porous carbon materials and showing a sharp pore distribution.

On the other hand, the greenhouse effect caused by carbon dioxide, generated as a product of combustion in large quantity at factories, automobiles and the like, is now becoming an issue. Also, one of the important resources, natural gas, contains about 5 to 10% of carbon dioxide, and is required to remove the carbon dioxide for using as a fuel. In addition, it is necessary to remove carbon dioxide discharged from a human body in a hermetic environment such as spacecraft, submarine and deep submergence vehicle.

In view of these circumstances, a technology to separate and remove carbon dioxide from a mixed gas containing carbon dioxide is required.

In general, the method for separating carbon dioxide can be divided into gas absorption method, membrane separation process and gaseous adsorption method.

In the above gas absorption method, a fluid able to dissolve a large amount of carbon dioxide is brought into contact with treatment gas to incorporate carbon dioxide into the fluid. In some cases, a physical absorption fluid such as triethylene glycol and propylene carbonate may be used, and in other cases, a chemical absorption fluid such as amine solution and potassium carbonate aqueous solution may be used. This absorption method requires regenerating procedure to separate carbon dioxide for reusing the absorption fluid. Also, a large quantity of the absorption fluid is used, so that a lot of energy is needed for heating/cooling procedures of the absorption fluid.

Also, the membrane separation process involves making only a target component permeate a polymer membrane such as polyimide having carbon dioxide selectivity for separating the same. This method is unsatisfactory in small amount of permeation because gas permeates a solid polymer membrane, as well as in expensive membrane, etc.

The above background results in attracting attention on the separation by the gaseous adsorption method. In the gaseous adsorption method, a solid adsorption material is used as a third component for separation. The adsorption material may include zeolite, activated carbon, etc. The zeolite is characterized by adsorbing a lot of carbon dioxide even at low partial pressure, but it is necessary to add a dehumidification step before the adsorption when water coexists because adsorption capability to water is notably large.

Recently, airtightness of ordinary houses is improved due to development in technologies such as building materials, designing and construction. With the developments, the concentration of carbon dioxide comes to be considered necessary to be maintained in ordinary houses in addition to the above-mentioned spacecraft, submarine, deep-sea vessel and the like. Features required in carbon dioxide removal equipments for ordinary houses may include small size/lightweight, safety and high energy efficiency, and carbon dioxide adsorption with carbon material satisfying these features is becoming the focus of attention.

As described above, the porous carbon material has a great deal of potential as a gaseous adsorbent. It is believed that particularly the carbon material having many micropores is very advantageous in adsorption of hydrogen gas, carbon dioxide, carbon monoxide, methane, ethane and other lower hydrocarbon gases, which are small in gas molecular size. However, in the adsorption of any gas, it is necessary to maintain both large pore volumes for improving adsorbed gas amount and sharp pore distribution for adsorbing a specific gas.

[Patent Document 1] The Japanese Unexamined Patent Publication 2001-026414

[Patent Document 2] The Japanese Unexamined Patent Publication 2003-038953

[Patent Document 3] The Japanese Unexamined Patent Publication H5-319813

[Patent Document 4] The Japanese Unexamined Patent Publication 2006-117523

SUMMARY OF THE INVENTION

Therefore, the purpose of the present invention is to provide a porous carbon material having large volume of the pores suitable for adsorbing gas such as hydrogen and carbon dioxide, and also having a sharp pore distribution of the above pores.

The present inventors focused attention on that a porous carbon material comprising carbonized material obtained by heating (hereinafter may be referred to as heating treatment) phenolic resin in a non-oxidizing atmosphere has a sharp pore distribution in which micropores occupy a large part of pores, and as a result of further investigation, found that particularly the pore having a diameter of 1.0 nm or less (the pore where the measurement results by the after-mentioned measurement method fall in the range of 0.4 to 1.0 nm. Hereinafter, it may be referred to as subnanopore) among the above micropores is largely related to adsorption of gas, small in molecular size, such as the hydrogen gas and carbon dioxide.

Then, based on the above findings, the present inventors dedicated efforts to develop a porous carbon material having increased volume of the subnanopores and increased adsorbed gas amount per unit volume, and as a result, successfully obtained a porous carbon material having large volume of subnanopores and showing a sharp pore distribution in which the subnanopores occupy the large part of pores, which has not attained in conventional porous carbon materials, by adding sodium hydroxide and/or potassium hydroxide to a raw material, phenolic resin, in the heating treatment. It was also confirmed that this porous carbon material is highly useful as a gaseous adsorbent, and thus, the present invention came to be completed.

The present invention provides a method for producing said porous carbon material. Namely, the method for producing a porous carbon material of the present invention comprises heating a cured phenolic resin complex lump, including 150 to 450 parts by weight of sodium hydroxide and/or potassium hydroxide per 100 parts by weight of phenolic resin, at a temperature of 420 to 850° C. in a non-oxidizing atmosphere to obtain carbonized material; and washing the carbonized material for removing the sodium hydroxide and potassium hydroxide included therein.

In the above method of production, sodium concentration and potassium concentration in the carbonized material after washing are preferably 10 wt % or less, and for washing for removing the sodium hydroxide and potassium hydroxide included in the carbonized material, it is preferred to use dilute hydrochloric acid and water.

According to the above method of production, there is provided a porous carbon material, in which a volume of a pore (subnanopore) having a diameter of in a range of 0.45 to 1.0 nm is 0.4 $cm^3/g$ or more, and a ratio of the volume of the pore having a diameter of in the range of 0.45 to 1.0 nm to a volume of a pore having a diameter of in a range of 0.45 nm to 0.4 μm (hereinafter may be referred to as the total pore volume) is 67% or more.

Note that in the present invention, the pore volume is, as specifically shown in the after-mentioned examples, a value calculated based on the nitrogen adsorption isotherm obtained by nitrogen adsorption method by using a slit model of HK (Horvath-Kawazoe) method.

Since the pores having the measured diameter of more than 0.4 μm are rarely involved in the gas adsorption in the porous carbon material, the ratio of the subnanopore volume to the pore volume (total pore volume) within the above range are calculated, which is an indicator showing a sharp distribution of the subnanopores in the porous carbon material of the present invention.

In the porous carbon material of the present invention, it is preferable that an atomic ratio (H/C) of hydrogen and carbon is 0.01 to 0.4 to increase the pore volume.

According to the present invention, there is provided a porous carbon material combining two properties, which have not attained in conventional porous carbon material: a sharp pore distribution in which subnanopores occupy the large part, and large volume of subnanopores.

Also, the above porous carbon material is highly useful as a carbon-based gaseous adsorbent material able to adsorb gas having small molecular size such as hydrogen in the high density per unit volume.

DETAILED DESCRIPTION OF THE INVENTION

Hereinafter, the present invention will be explained in detail on a porous carbon material obtained by the method of production of the present invention, and then on a method for producing the carbon material.

(Porous Carbon Material)

The porous carbon material according to the present invention has a subnanopore having a volume exceeding 0.4 cm$^3$/g, and a ratio of the subnanopore volume to the total pore volume is 67% or more.

The above subnanopore volume of the porous carbon material of the present invention and the ratio of the subnanopore volume to the total pore volume are very large, which have not attained in activated carbon and porous carbon materials produced by the conventional methods using, for example, phenolic resin, etc., as the raw materials.

According to the present invention, as shown in the after-mentioned examples, it is possible to provide a porous carbon material in which the above subnanopore volume is preferably 0.45 cm$^3$/g or more, further preferably 0.5 cm$^3$/g or more, and the ratio of the subnanopore volume to the total pore volume is preferably 75% or more, further preferably 80% or more.

In particular, the porous carbon material of the present invention comprising carbonized material obtained by using phenolic resin as its raw materials and heating the same in the after-mentioned method of production is presumed to have a polyacene structure, and such a porous carbon material combines the large volume of subnanopore and sharp pore distribution, which are not attainable even by high-performance activated carbon.

The porous carbon material having such a subnanopore is first provided by the present invention, and its contribution can be extremely high in the use of the gaseous adsorption. Namely, for the porous carbon material of the present invention, adsorbed gas amount per unit volume can dramatically be improved in the gaseous adsorption of hydrogen gas and the like (hydrogen storage), and also, excellent separation property can be expected in the separation of carbon dioxide because of its sharp pore distribution. On the other hand, the activated carbon is known as a carbon material having large pore volume, but the activated carbon is broad in pore distribution and includes large amounts of mesopores and macropores which contribute not to the hydrogen storage, so that it is difficult to increase the hydrogen storage capacity per unit volume.

The porous carbon material of the present invention is, as mentioned above, highly useful as a hydrogen storage material. Namely, as shown in the after-mentioned examples, the porous carbon material of the present invention is capable to store a large volume of hydrogen via a large volume of subnanopores, which has not attained by conventional porous carbon materials. Also, with its sharp pore distribution due to few mesopores and macropores, the porous carbon material of the present invention is larger in the hydrogen storage capacity per unit volume than conventional porous carbon materials.

Also, in the porous carbon material of the present invention, an atomic ratio (H/C) of hydrogen and carbon is preferably 0.01 to 0.4, particularly preferably 0.01 to 0.2, because such a ratio is advantageous in pore forming. When the above atomic ratio exceeds 0.4, the pore volume tends to be lowered.

Also, it is preferable that the porous carbon material of the present invention includes oxygen atom in the structure in addition to hydrogen and carbon.

(Method for Producing Porous Carbon Material)

For the method for producing a porous carbon material of the present invention, there may be mentioned a method comprising: heating a cured phenolic resin complex lump, including 150 to 450 parts by weight of sodium hydroxide and/or potassium hydroxide per 100 parts by weight of phenolic resin, at a temperature of 420 to 850° C. in a non-oxidizing atmosphere to obtain carbonized material; and washing the carbonized material for removing sodium hydroxide and potassium hydroxide included therein.

The phenolic resin used in the above method of production may be any one of novolac-type, resol-type and composite thereof, and it is preferable to use water-soluble resol-type because a method to mix the phenolic resin and sodium hydroxide in an aqueous vehicle is easier as a method of producing the cured phenolic resin complex lump, as mentioned later.

When the phenolic resin used in the above method of production is novolac-type, a curing agent mixed therewith may be any curing agent normally used without particular limitation. For example, publicly known curing agents such as hexamethylenetetramine, benzoxazine derivative, phenylenebisoxazoline and divinylbenzene can be used.

In the method for producing a porous carbon material of the present invention, it is preferable that the content ratio of the sodium hydroxide and/or potassium hydroxide in the cured phenolic resin complex lump is 150 parts by weight or more to 100 parts by weight of the phenolic resin. Namely, when the content ratio of the sodium hydroxide and/or potassium hydroxide is less than 150 parts by weight, the subnanopore volume obtained in the after-mentioned heating treatment tends to be lowered. On the other hand, when the content of the sodium hydroxide and/or potassium hydroxide is too large, the sodium hydroxide and potassium hydroxide incorporated in the resin structure formed by the phenolic resin may be saturated. In general, when the ratio of the sodium hydroxide and/or potassium hydroxide is 200 parts by weight or so, pore structure may be stable. However, when the content ratio of the sodium hydroxide and/or potassium hydroxide exceeds 450 parts by weight, it tends to be hard to prepare the cured phenolic resin complex lump because curing and drying steps require time.

Therefore, it is preferable to prepare the cured phenolic resin complex lump so as to have the content ratio of the sodium hydroxide and/or potassium hydroxide of 150 parts by weight to 450 parts by weight, particularly 190 to 400 parts by weight. Each of the sodium hydroxide and potassium hydroxide may be used alone or in combination.

The method for producing the above cured phenolic resin complex lump is not particularly limited if the method allows the sodium hydroxide and/or potassium hydroxide to uniformly be dispersed in the phenolic resin. A preferred method of production may be a method in which the phenolic resin is dissolved in an aqueous vehicle where sodium hydroxide is dissolved, followed by drying and curing.

It is preferable to conduct the above drying and curing in air within the temperature range of 100° C. to 200° C.

In the method for producing a porous carbon material of the present invention, the atmosphere of the heating treatment of the cured phenolic resin complex lump needs to be non-oxidizing for preventing combustion of the phenolic resin. The above non-oxidizing atmosphere can be formed by nitrogen gas, argon gas, helium gas and the like, and in view of rich reserve, nitrogen gas is preferable. Also, the gas used for the non-oxidizing atmosphere is desired to be flowed so as to prevent pyrolysis products, generated by thermal reaction in the heating treatment of the cured phenolic resin complex lump, from remaining.

Also, the temperature range of the thermal reaction in the heating treatment is preferably 420 to 850° C. When the temperature of the thermal reaction is less than 420° C., the subnanopore volume may be lowered, and on the other hand, when it exceeds 850° C., the pore distribution may be broad, which is not preferable. The temperature of the above thermal reaction is preferably 420 to 750° C., further preferably 500 to 750° C.

Also, the temperature rising rate during the thermal reaction is preferably 50 to 400° C./hour (h) in view of efficiency of the pyrolysis reaction. Also, the holding time at the desired temperature of the thermal reaction is preferably in the range of 0.5 to 8 hours.

In the heating treatment of the above cured phenolic resin complex lump, any known electric furnace can be used.

In the method for producing a porous carbon material of the present invention, the carbonized material obtained after the thermal reaction due to the heating treatment is washed for removing the included sodium hydroxide and potassium hydroxide, so that the subnanopores are generated. The washing is done for removing the sodium hydroxide and potassium hydroxide by using an aqueous vehicle, and it is particularly preferable to wash with 1 wt % or less of dilute hydrochloric acid.

Also, for the level of the washing and removing of the sodium hydroxide and potassium hydroxide, lower sodium concentration and potassium concentration after washing are more preferable, and the total concentration of sodium and potassium included in the carbonized material after washing is 10 wt % or less, preferably 1 wt % or less, further preferably 0.1 wt % or less.

The washing and removing of the sodium hydroxide and potassium hydroxide from the carbonized material in the present invention may be done on the monolithic carbonized material in which the shape of the cured phenolic resin complex lump remains, and for more efficiently washing, the carbonized material can be pulverized, followed by the washing in a preferred embodiment. The degree of pulverization of the above carbonized material is not particularly limited, and it is preferable to pulverize the carbonized material to have an average particle size of 1 µm to 5 µm, particularly 5 µm to 5 mm.

Also, the porous carbon material obtained by washing and removing of the sodium hydroxide and potassium hydroxide from the above carbonized material may be, if necessary, subject to drying treatment before use.

When the porous carbon material of the present invention is used, for example, for the hydrogen storage material and the like, it is possible to shape this into any desired form. For example, any known methods for pulverization, pelletization, coating, pressurization, etc. can be used without any limitation.

Also, the porous carbon material having the forms, i.e. powder form, pellet form and film form, can be filled in a hydrogen storage container to store and release hydrogen with changes in pressure or temperature.

EXAMPLES

Hereinafter, the present invention will be explained in further detail based on examples and comparative examples, but the present invention is not limited to these examples.

Note that the values in examples and comparative examples were measured and/or calculated by the following methods.

(1) Subnanopore Volume & Entire Pore Volume

Using ASAP2020 of Micromeritics Instrument Corporation, nitrogen adsorption isotherm at 77K was obtained for a sample, and based on the measurements, the volume of pore having a diameter of 1 nm or less was calculated by using a slit model of HK (Horvath-Kawazoe) method.

Also, the total pore volume was calculated from the volume of nitrogen adsorbed until the maximum relative pressure of 0.995. Namely, the total pore volume was the volume of pores having a pore diameter within the range of 0.45 nm (corresponding to the lower limit of the pore diameter in which nitrogen molecule can enter at 77K) to 0.4 µm (corresponding to the relative pressure, 0.995, of nitrogen gas at 77K) in this context.

(2) Density

Using a gas pycnometer, AccuPyc 1330 of Micromeritics Instrument Corporation, the density was measured at the temperature of 25° C. with helium gas as media by gas displacement method.

(3) H/C

Using Series II CHNS/O Elemental Analyzer 2400 of PerkinElmer Inc., the weight ratio of carbon, hydrogen and nitrogen was measured. Weight ratio of carbon and hydrogen was converted to an atomic ratio to obtain an H/C value.

(4) Hydrogen Storage Capacity

Using PCT properties measuring apparatus of Suzuki Shokan Co., Ltd., the pressure was gradually changed till the maximum hydrogen pressure of 10 MPa at fluid nitrogen temperature (77K) by volumetric method (Sievert's method) to measure hydrogen storage property. Then, hydrogen storage capacities (wt %) at the hydrogen pressure of 2 MPa and 6 MPa were calculated by NIST calculation formula.

The hydrogen storage capacity (wt %) obtained by the above measurement, the total pore volume $V_{t\,p}$ ($cm^3/g$) obtained in the above (1) and the He density $\rho_s$ ($g/cm^3$) obtained in the above (2) were used to calculate hydrogen storage capacity ($kg/m^3$) per unit volume by the following formula.

$$\text{Hydrogen Storage Capacity (kg/m}^3) = \frac{\text{Hydrogen Storage Capacity (wt \%)} \times 10}{1/\rho_s + V_{tp}}$$ [Formula 1]

Example 1

192 parts by weight of sodium hydroxide per 100 parts by weight of phenolic resin was dissolved in 384 parts by weight of ion-exchange water. The sodium hydroxide aqueous solution was added with an aqueous solution of resol-type phenolic resin (also including formaldehyde and phenol; solid content ratio 52%), and stirred with a magnetic stirrer for 15 minutes. The mixture was heated in air at temperature of 150° C. for drying and curing reactions, so that a cured phenolic resin complex lump was obtained.

Then, using a tubular electric furnace, the temperature was raised to 420° C. at a rate of 100° C./h with the flow of nitrogen gas, and held at the same temperature for 2 hours, followed by temperature lowering to room temperature at a rate of 100° C./h. The product of the thermal reaction was taken out of the electric furnace, and pulverized in a mortar such that the average particle size of the carbonized material became 15 μm, followed by washing with ion-exchange water and 0.2% hydrochloric acid.

The washed product of the thermal reaction (carbonized material) was subject to vacuum drying at 200° C. for 8 hours, then, put in a zirconia container (interior content of 80 cm³) with 100 g of zirconia balls (diameter of 5 mm) therein, and pulverized for 5 minutes in a planetary ball mill at a rotational speed of 400 rpm.

Thus-obtained porous carbon material powder (average particle size of 3 μm) was subject to each measurement. The results are shown in Table 1.

Examples 2 to 9 and Comparative Examples 1 & 2

Except for changing the thermal reaction temperature to the temperature shown in Table 1, a porous carbon material powder was obtained as with Example 1. Each of measurement results is shown in Table 1.

Examples 10 to 14

Except for changing mixture ratio of phenolic resin and sodium hydroxide, a porous carbon material powder was obtained as with Example 5. Each of measurement results is shown in Table 1.

Example 15

Except for using potassium hydroxide instead of sodium hydroxide, a porous carbon material powder was obtained as with Example 7. Each of measurement results is shown in Table 1.

Comparative Example 3

RESITOP PL-4646 of Gunei Chemical Industry Co., Ltd. having resol-type phenolic resin as its main component (water-soluble liquid form, also containing phenol and formaldehyde as other components) was heated in air at temperature of 150° C. for curing reaction.

Then, using a tubular electric furnace, the temperature was raised to 600° C. at a rate of 100° C./h with the flow of nitrogen gas, and held at the same temperature for 2 hours, followed by temperature lowering to room temperature at a rate of 100° C./h. The product of the thermal reaction was put in a zirconia container (interior content of 80 cm³) with 100 g of zirconia balls (diameter of 5 mm) therein, and pulverized for 5 minutes in a planetary ball mill at a rotational speed of 400 rpm.

Thus-obtained porous carbon material powder (average particle size of 3 μm) was subject to each measurement. The results are shown in Table 1.

Comparative Example 4

Commercially available activated palm husk carbon was subject to each of the measurements in a similar fashion. The results are shown in Table 1.

Comparative Examples 5 to 7

Except for changing mixture ratio of phenolic resin and sodium hydroxide, a porous carbon material powder was obtained as with Example 5. Each of measurement results is shown in Table 1.

TABLE 1

| Example | Amount added of alkali hydroxide Parts by weight | Thermal reaction temp. ° C. | Subnano- pore volume Vsnp cm³/g | Total pore volume Vtp cm³/g | Vsnp/Vtp % | H/C g/cm³ | Density g/cm³ | Hydrogen storage capacity 2 MPa kg/m³ | 6 MPa kg/m³ |
|---|---|---|---|---|---|---|---|---|---|
| Example 1 | 192 (NaOH) | 420 | 0.44 | 0.541 | 81.3 | 0.29 | 1.60 | 22.7 | 31.0 |
| Example 2 | 192 (NaOH) | 430 | 0.44 | 0.528 | 83.3 | 0.28 | 1.59 | 23.7 | 31.7 |
| Example 3 | 192 (NaOH) | 440 | 0.43 | 0.506 | 85.0 | 0.24 | 1.65 | 26.0 | 34.6 |
| Example 4 | 192 (NaOH) | 450 | 0.49 | 0.593 | 82.6 | 0.21 | 1.74 | 27.4 | 35.9 |
| Example 5 | 192 (NaOH) | 500 | 0.59 | 0.710 | 83.1 | 0.11 | 1.85 | 30.1 | 39.0 |
| Example 6 | 192 (NaOH) | 600 | 0.60 | 0.730 | 82.2 | 0.06 | 2.08 | 31.5 | 40.4 |
| Example 7 | 192 (NaOH) | 700 | 0.57 | 0.707 | 80.6 | 0.12 | 2.03 | 30.8 | 40.3 |

TABLE 1-continued

| Example | Amount added of alkali hydroxide Parts by weight | Thermal reaction temp. °C. | Subnano-pore volume Vsnp cm³/g | Total pore volume Vtp cm³/g | Vsnp/Vtp % | H/C | Density g/cm³ | Hydrogen storage capacity 2 MPa kg/m³ | 6 MPa kg/m³ |
|---|---|---|---|---|---|---|---|---|---|
| Example 8 | 192 (NaOH) | 750 | 0.65 | 0.823 | 79.0 | 0.01 | 2.17 | 31.5 | 40.0 |
| Example 9 | 192 (NaOH) | 800 | 0.64 | 0.945 | 67.7 | 0.03 | 2.15 | 29.1 | 38.9 |
| Example 10 | 154 (NaOH) | 500 | 0.43 | 0.501 | 85.8 | 0.23 | 1.81 | 27.1 | 34.4 |
| Example 11 | 173 (NaOH) | 500 | 0.54 | 0.674 | 80.1 | 0.15 | 1.82 | 27.1 | 36.0 |
| Example 12 | 231 (NaOH) | 500 | 0.49 | 0.618 | 79.3 | 0.14 | 1.85 | 26.5 | 34.8 |
| Example 13 | 288 (NaOH) | 500 | 0.44 | 0.563 | 78.2 | 0.15 | 1.76 | 23.8 | 31.2 |
| Example 14 | 385 (NaOH) | 500 | 0.50 | 0.647 | 77.3 | 0.14 | 1.80 | 26.4 | 35.6 |
| Example 15 | 192 (KOH) | 700 | 0.46 | 0.651 | 70.7 | 0.10 | 2.04 | 24.6 | 31.0 |
| Comp. Ex. 1 | 192 (NaOH) | 400 | 0.00 | 0.008 | 0 | 0.74 | 1.27 | 2.9 | 5.5 |
| Comp. Ex. 2 | 192 (NaOH) | 900 | 0.30 | 0.687 | 43.7 | 0.11 | 2.01 | 17.3 | 20.5 |
| Comp. Ex. 3 | — | 600 | 0.17 | 0.206 | 82.5 | 0.27 | 1.47 | 17.8 | 22.4 |
| Comp. Ex. 4 | — | — | 0.27 | 0.359 | 75.2 | 0.08 | 1.92 | 21.8 | 24.6 |
| Comp. Ex. 5 | 96 (NaOH) | 500 | 0.17 | 0.667 | 25.49 | 0.30 | 1.27 | 9.95 | 15.85 |
| Comp. Ex. 6 | 135 (NaOH) | 500 | 0.23 | 0.288 | 79.66 | 0.37 | 1.53 | 19.23 | 26.25 |
| Comp. Ex. 7 | 577 (NaOH) | 500 | 0.32 | 0.572 | 55.94 | 0.24 | 1.68 | 21.01 | 27.19 |

The invention claimed is:

1. A porous carbon material wherein a volume of a pore having a diameter of in a range of 0.45 to 1.0 nm is 0.4 cm³/g or more, a ratio of said volume of the pore having a diameter of in a range of 0.45 to 1.0 nm to a volume of a pore having a diameter of in a range of 0.45 nm to 0.4 μm is 67% or more, and an atomic ratio of hydrogen and carbon is 0.01 to 0.4.

2. A hydrogen storage material comprising the porous carbon material as set forth in claim 1.

* * * * *